United States Patent [19]
Fox et al.

[11] Patent Number: 5,437,102
[45] Date of Patent: Aug. 1, 1995

[54] SYSTEMS FOR CUTTING A SEAT BELT TO FREE A PASSENGER TRAPPED IN AN AUTOMOBILE

[76] Inventors: Lawrence D. Fox; Anne M. Fox, both of Cabot Rd., Westfield, Mass. 01085

[21] Appl. No.: 160,663

[22] Filed: Dec. 2, 1993

[51] Int. Cl.⁶ ............................................. B26B 29/02
[52] U.S. Cl. ................................................... 30/298.4
[58] Field of Search ..................... 30/298.4, 294, 303, 30/253, 299, 231; 280/801.1; 248/37.3; 211/70.6

[56] References Cited

U.S. PATENT DOCUMENTS

| | | | |
|---|---|---|---|
| 4,089,113 | 5/1978 | Moritz et al. | 30/253 |
| 4,092,776 | 6/1978 | Ferguson | 30/253 |
| 4,984,368 | 1/1991 | Hoover et al. | 280/801.1 X |
| 5,085,449 | 2/1992 | Hudson | 30/298.4 |

*Primary Examiner*—Douglas D. Wyatts

[57] ABSTRACT

Systems for use in cutting seat belts to free passengers trapped in automobiles comprising a cutter formed in an inverted V-shaped configuration having a first leg and a second leg, each leg having a free end and a pivot end with a flexible apex therebetween, the free end of the first leg being formed with a circular thumb support, the free end of the second leg being formed with a curved finger support, the first and second legs being formed with recesses mutually facing each other; a first blade with a linear cutting edge secured within the recess of the first leg; a second blade with an outwardly curved cutting edge located within the recess of the second leg; and a holster for receiving the cutter, the holster being formed in a V-shaped configuration with elongated side edges terminating in a point adjacent to which the apex of the cutter is positionable, the holster also having a short free edge adjacent to which the supports of the legs are positionable, the short free edge having an opening for the insertion of the cutter with the circular finger support located exteriorly of the recess.

5 Claims, 4 Drawing Sheets

SYSTEMS FOR CUTTING A SEAT BELT TO FREE A PASSENGER TRAPPED IN AN AUTOMOBILE

BACKGROUND OF THE INVENTION

1. Field of the Invention

The present invention relates to systems for cutting seat belts to free passengers trapped in automobiles and more particularly pertains to a cutter and holster positionable in an automobile for use in freeing a passenger trapped in an automobile.

2. Description of the Prior Art

The use of cutting devices is known in the prior art. More specifically, cutting devices heretofore devised and utilized for the purpose of freeing trapped passengers in automobiles are known to consist basically of familiar, expected and obvious structural configurations, notwithstanding the myriad of designs encompassed by the crowded prior art which have been developed for the fulfillment of countless objectives and requirements.

Many types of cutting devices are in the prior art including patents. By way of example, U.S. Pat. Nos. 4,984,368 to Hoover and 5,097,599 to Hasegawa disclose scissors of a generally conventional configuration.

U.S. Pat. No. 4,680,861 to Meurer discloses a cutter with opposed blades. U.S. Pat. Nos. 4,815,211 to Garcia and 5,085,449 to Hudson disclose single cutters with blades for use on safety belts.

In this respect, the systems for cutting a seat belt to free a passenger trapped in an automobile according to the present invention substantially departs from the conventional concepts and designs of the prior art, and in so doing provides an apparatus primarily developed for the purpose of freeing trapped passengers in automobiles.

Therefore, it can be appreciated that there exists a continuing need for new and improved systems for cutting a seat belt to free a passenger trapped in an automobile which can be maintained and used conventially and safely. In this regard, the present invention substantially fulfills this need.

SUMMARY OF THE INVENTION

In view of the foregoing disadvantages inherent in the known types of cutting devices now present in the prior art, the present invention provides an improved systems for cutting a seat belt to free a passenger trapped in an automobile. As such, the general purpose of the present invention, which will be described subsequently in greater detail, is to provide a new and improved systems for cutting a seat belt to free a passenger trapped in an automobile apparatus and method which has all the advantages of the prior art and none of the disadvantages.

To attain this, the present invention essentially comprises a system for use in cutting a seat belt to free a passenger trapped in an automobile accident comprising a cutter formed in an inverted V-shaped configuration having a first leg and a second leg, each leg having a free end and a pivot end with a flexible apex therebetween, the free end of the first leg being formed with a circular thumb support, the free end of the second leg being formed with a curved finger support, the first and second legs being formed with recesses mutually facing each other; a first blade with a linear cutting edge secured within the recess of the first leg; a second blade with an outwardly curved cutting edge located within the recess of the second leg; and a holster for receiving the cutter, the holster being formed in a V-shaped configuration with elongated side edges terminating in a point adjacent to which the apex of the cutter is positionable, the holster also having a short free edge adjacent to which the supports of the legs are positionable, the short free edge having an opening for the insertion of the cutter with the circular finger support located exteriorly of the recess.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved systems for cutting a seat belt to free a passenger trapped in an automobile which has all the advantages of the prior art cutting devices and none of the disadvantages.

It is another object of the present invention to provide a new and improved systems for cutting a seat belt to free a passenger trapped in an automobile which may be easily and efficiently manufactured and marketed.

It is a further object of the present invention to provide a new and improved systems for cutting a seat belt to free a passenger trapped in an automobile which is of a durable and reliable construction.

An even further object of the present invention is to provide a new and improved systems for cutting a seat belt to free a passenger trapped in an automobile which is susceptible of a low cost of manufacture with regard to both materials and labor, and which accordingly is then susceptible of low prices of sale to the consuming public, thereby making such systems for cutting a seat belt to free a passenger trapped in an automobile economically available to the buying public.

Still yet another object of the present invention is to provide a new and improved systems for cutting a seat belt to free a passenger trapped in an automobile which provides in the apparatuses and methods of the prior art some of the advantages thereof, while simultaneously overcoming some of the disadvantages normally associated therewith.

Still another object of the present invention to free passengers trapped in automobiles.

Yet another object of the present invention is to cut seat belts from trapped passengers in cars.

Even still another object of the present invention is to provide a new and improved apparatus for use in cutting a seat belt to free a passenger trapped in an automobile accident comprising a cutter formed in an inverted V-shaped configuration having a first leg and a second leg, each leg having a free end and a pivot end with a flexible apex therebetween, the free end of the first leg being formed with a circular thumb support, the free end of the second leg being formed with a curved finger support, the first and second legs being formed with recesses mutually facing each other; a first blade with a linear cutting edge secured within the recess of the first leg; a second blade with an outwardly curved cutting edge located within the recess of the second leg; and a holster for receiving the cutter, the holster being formed in a V-shaped configuration with elongated side edges terminating in a point adjacent to which the apex of the cutter is positionable, the holster also having a short free edge adjacent to which the supports of the legs are positionable, the short free edge having an opening for the insertion of the cutter with the circular finger support located exteriorly of the recess.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
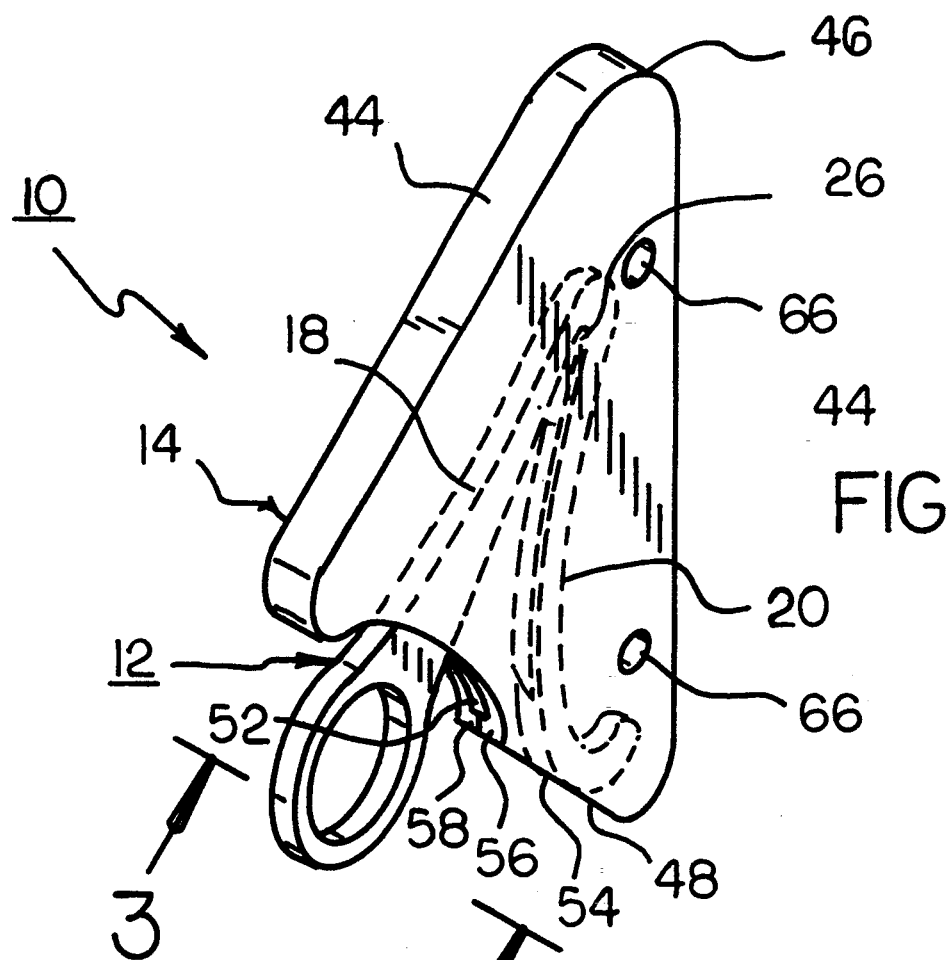
FIG. 1 is a perspective illustration of a system for cutting a seat belt to free a passenger trapped in an automobile.
Figure 2:
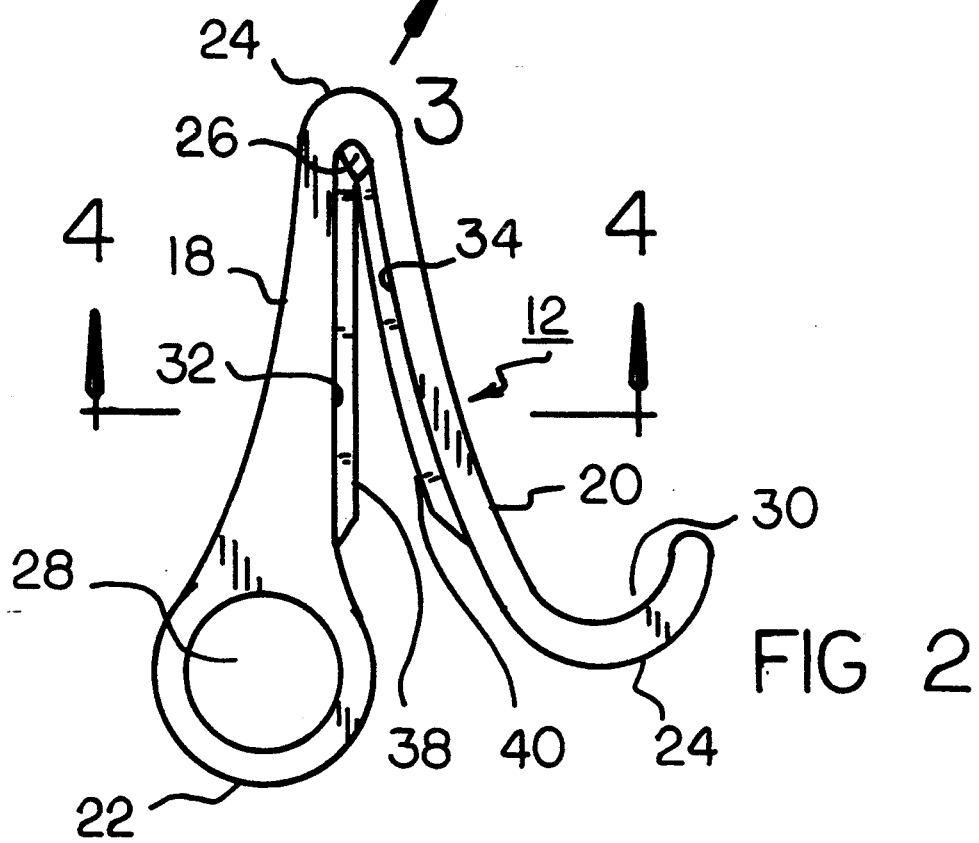
FIG. 2 is an elevational view of the cutter shown in FIG. 1.
Figure 3:
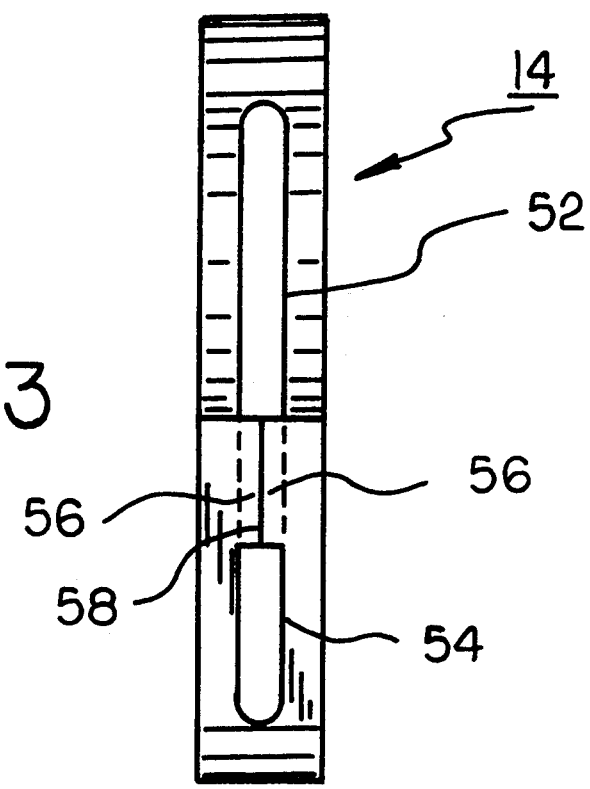
FIG. 3 is an end elevational view taken along line 3—3 of FIG. 1.
Figure 4:
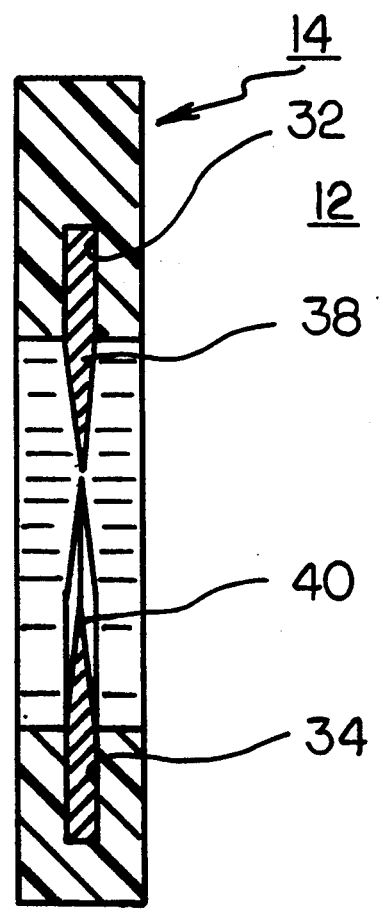
FIG. 4 is a sectional view taken along line 4—4 of FIG. 2.

With reference now to the drawings, and in particular to FIG. 1 thereof, a new and improved systems for cutting a seat belt to free a passenger trapped in an automobile embodying the principles and concepts of the present invention and generally designated by the reference numeral 10 will be described.

More specifically, it will be noted by reference to FIGS. 1 through 4 that the system 10 is comprised of two major components, the cutter 12 and the holster 14.

The cutter 12 is formed in an inverted v-shaped configuration. It has a first leg 18 and a second leg 20. Each leg has a free end 22 and a pivot end 24. A flexible apex 26 couples the legs. For grasping the cutter, the free end of the first leg 18 is formed with a circular thumb support 28. The free end of the second leg is formed with a curved finger support 30. In order for the legs to support their cutting blades, the first and second legs are formed with recesses 32 and 34 mutually facing each other.

In order for the legs and recesses to cooperably function to achieve the desired cutting function, a first blade 38 with a linear cutting edge is located and secured within the recess 32 of the first leg 18 for functioning in cooperation therewith, a second blade 40 with an outwardly curved cutting edge is located and secured within the recess 34 of the second leg 20.

In addition to the cutter 12, the system of the present invention includes a holster 14. Note FIGS. 1, 3 and 4. The holster 14 functions for receiving and holding the cutter 12. The holster 14 is formed in a V-shaped configuration with elongated side edges 44 terminating in a point 46 adjacent to which the apex 26 of the cutter is positionable. The holster 14 also has a short free edge 48 adjacent to which the supports 28 and 30 of the legs 18 and 12 are positionable. The short free edge 48 has a pair of openings 52 and 54 for the insertion of the cutter with the circular finger support located exteriorly of the recesses.

Specifically, the larger opening 52 is for the passage of the first leg 18 during inserting the cutter into the holster and its removal thereon. The finger support 28 is always exterior of the holster. The smaller opening 54 is for the passage of the second leg 20 and thumb support 30 into and out of the holster. Flexible fingers 56 with a slit 58 therebetween separate during movement of the cutter into and out of the holster. Note FIGS. 1 and 3.

Figure 8:
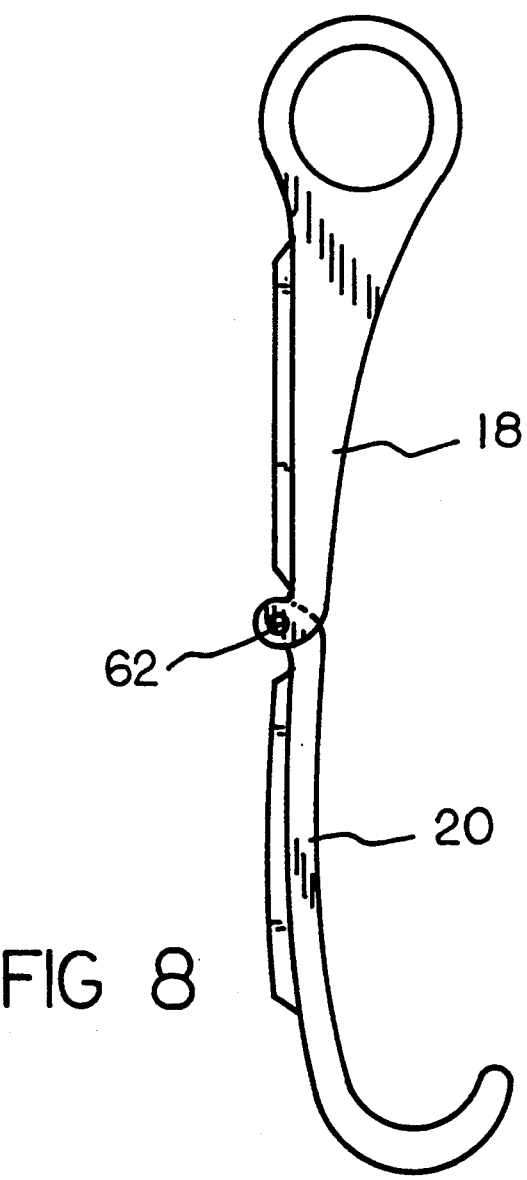
FIG. 8 is a front elevational view of a cutter constructed in accordance with an alternate embodiment of the invention.

In the embodiment of FIGS. 1 through 4, the legs 18 and 20 are formed integrally and are flexibly coupled at the apex 23. In an alternate embodiment of the invention as shown in FIG. 8, the apex includes a hinge 62. When a hinge 62 is employed, the device is too dangerous for the general public, and its use is preferably limited to emergency personnel only such as fire, police, E.M.T. and the like. Further, a belt clip would be formed on the holster for removable coupling to a potential user.

In order to position the holster 14 and hence the cutter 12 in a preferred position for convenient operation and use, there are further included screw holes 66 in the holster to couple the holster to an appropriate surface of an automobile. Such holes or attached means are employed in all embodiments of the invention.

Figure 5:
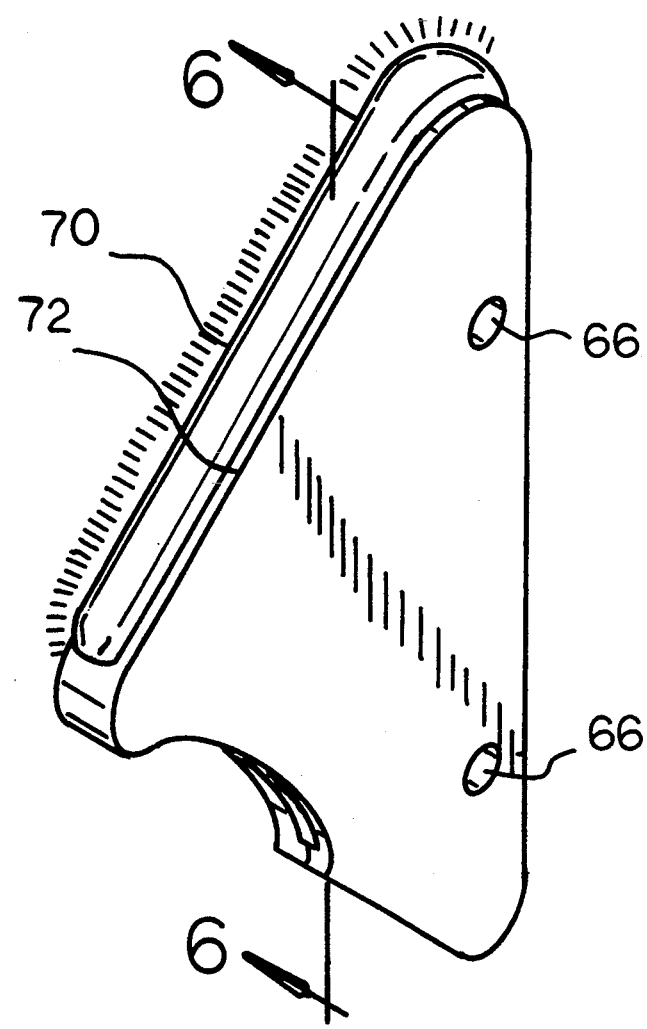
FIG. 5 is a perspective view of a holster constructed in accordance with an alternate embodiment of the invention.
Figure 6:
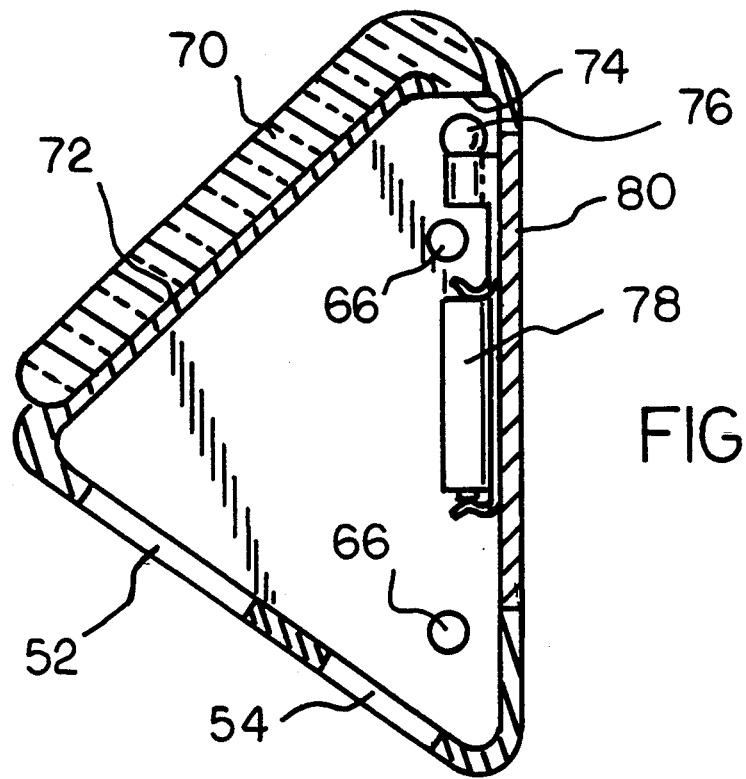
FIG. 6 is a sectional view taken along line 6—6 of FIG. 5.

In the embodiment of the invention as shown in FIGS. 5 and 6, there is employed means to illuminate the periphery of the holster. Such includes a translucent member 70 formed along an edge 72 of the holster. The member 70 has one edge 74 in communication with the open interior of the holster adjacent a bulb 76. The bulb 76 is powered by a battery 78 with electrical connectors therebetween. This feature allows finding the holster and cutter during night time when locating the cutter and holster would otherwise be difficult due to a lack of light. A panel 80 is remarkable to allow changing batteries. In addition, an on/off switch could be applied to preclude battery drainage when the vehicle was to be inactive for long periods of time.

Figure 7:
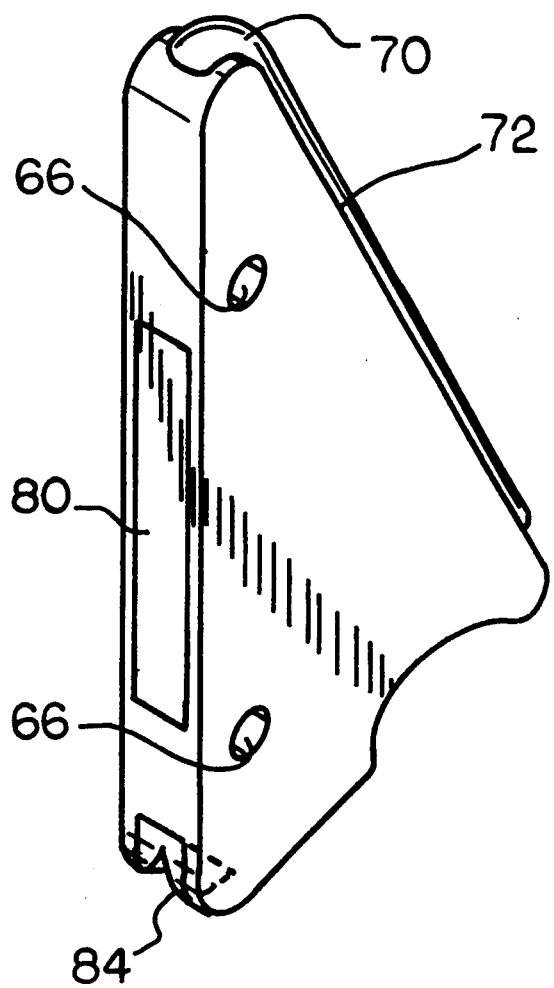
FIG. 7 is a perspective view of a holster constructed in accordance with another alternate embodiment of the invention.

The final embodiment of the invention is shown in FIG. 7. Such embodiment includes a blade sharpener 84. Such sharpener is formed in the holster adjacent to one corner thereof. It is of a conventional design but may be employed periodically for maximum performance of the system.

Lastly, for maximum safety, the device is intended for emergency use. After use, the used device should be replaced with a re-assembled or new cutter/holster system so as to be prepared for the next emergency. Similarly, the cut seat belt should also be replaced, all for maximum safety.

Seat belts and shoulder harnesses are important safety devices for automobiles and are required in every car sold in the United States. Their value in preventing death or serious injury in an accident has been proven innumerable times. In some accidents, however, they may jam or not release properly. Such can create a life-threatening situation. If this occurs, a device constructed in accordance with the present invention can be used to quickly and safely cut the belt and/or shoulder harness to allow a trapped person to get out or be removed promptly. The present invention is an improvement over other cutting devices that may be used for this purpose in that it is smaller, lighter, less expensive, always available, faster cutting, and safer.

The present invention is a safety device for shearing automobile seat belts and shoulder harnesses. It consists of a seat belt shearing tool and a mounting holster and is intended to be installed in automobiles near the door side of a seat belt. For optimal protection one should be installed on each side of an automobile.

The seat belt shearing tool has two knife blades inserted into a plastic holder, one with a straight edge and the other with a curved edge. The plastic holder is a single piece that diverges in a narrow "V" of about 15 degrees at the center. The two blades are inserted on the inside of the "V", and come together close to the point of the "V". The straight edged blade is about 1.50 inches long and is inserted into one arm that widens progressively to a loop at its end. The curved blade is about 1.25 inches long and is inserted into the straight part of the other arm, which then curves about 135 degrees. The loop arm is about 3 inches long and the curved arm is about 2.75 inches long. Both the loop and the curve have radiuses of about 0.50 inches to fit around fingers.

The mounting holster is triangular in shape, with rounded ends and a cutout on one side, which is open. The shearing tool fits into the holster, with the loop protruding through the cutout. Lips molded into the inside of the holster hold the shearing tool in place. Two screws attach the holster to the vehicle.

The disclosed embodiments of the invention are used by inserting a finger in the loop and pulling the shearing tool out of the holster. The shearing tool is then positioned with the belt or harness between the knife blades, another finger is wrapped around the curved end, and the tool is pulled to cut the belt and free the person.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A system for use in cutting a seat belt to free a passenger trapped in an automobile accident comprising, in combination:

a cutter formed in an inverted V-shaped configuration having a first leg and a second leg, each leg having a free end and a pivot end with a flexible apex therebetween, the free end of the first leg being formed with a circular thumb support, the free end of the second leg being formed with a curved finger support, the first and second legs being formed with recesses mutually facing each other;

a first blade with a linear cutting edge secured within the recess of the first leg;

a second blade with an outwardly curved cutting edge located within the recess of the second leg; and a holster for receiving the holster, the cutter being formed in a V-shaped configuration with elongated side edges terminating in a point adjacent to which the apex of the cutter is positionable, the holster also having a short free edge adjacent to which the supports of the legs are positionable, the short free edge having an opening for the insertion of the cutter with the circular finger support located exteriorly of the recess.

2. Apparatus for use in cutting a seat belt comprising:

a cutter formed in an inverted V-shaped configuration having a first leg and a second leg, each leg having a free end and a pivot end with an apex therebetween, the free end of the first leg being formed with a thumb support, the free end of the second leg being formed with a finger support, the first and second legs being formed with recesses mutually facing each other;

a first blade with a cutting edge secured within the recess of the first leg;

a second blade with a cutting edge located within the recess of the second leg; and a holster for receiving the cutter formed in an inverted V-shaped configuration with elongated side edges terminating in a point at the upper extent and a short free edge at the lower extension, the short free edge at the lower extension, the short free edge having an opening for the insertion of the cutter with at least one support located exteriorly of the recess.

3. The apparatus as set forth in claim 2 and further including means to couple the holster to a surface of an automobile.

4. The apparatus as set forth in claim 2 and further including means to illuminate the periphery of the holsters.

5. The apparatus as set forth in claim 2 and further including a blade sharpener means formed in the holster.

* * * * *